(12) United States Patent
Ahmed

(10) Patent No.: US 12,455,894 B2
(45) Date of Patent: Oct. 28, 2025

(54) ASYCHRONOUS DOCUMENT CHARTS

(71) Applicant: United Parcel Service of America, Inc., Atlanta, GA (US)

(72) Inventor: Waleed Ahmed, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/813,725

(22) Filed: Aug. 23, 2024

(65) Prior Publication Data

US 2024/0419679 A1    Dec. 19, 2024

Related U.S. Application Data

(62) Division of application No. 17/718,048, filed on Apr. 11, 2022, now Pat. No. 12,105,726.

(51) Int. Cl.
| | |
|---|---|
| *G06F 16/20* | (2019.01) |
| *G06F 16/23* | (2019.01) |
| *G06F 16/242* | (2019.01) |
| *G06F 16/25* | (2019.01) |

(52) U.S. Cl.
CPC ........ *G06F 16/254* (2019.01); *G06F 16/2379* (2019.01); *G06F 16/2443* (2019.01)

(58) Field of Classification Search
CPC . G06F 16/2379; G06F 16/2443; G06F 16/254
See application file for complete search history.

(56) References Cited

U.S. PATENT DOCUMENTS

| | | | | |
|---|---|---|---|---|
| 5,572,673 | A * | 11/1996 | Shurts | G06F 21/6218 726/17 |
| 7,318,215 | B1 * | 1/2008 | Krishnan | G06F 8/20 707/999.102 |
| 11,449,497 | B1 * | 9/2022 | Winiarski | G06F 16/2443 |
| 2013/0091181 | A1 * | 4/2013 | Arenswald | G06F 16/2455 707/E17.005 |
| 2014/0280324 | A1 * | 9/2014 | Teletia | G06F 16/951 707/770 |
| 2016/0342654 | A1 * | 11/2016 | Bendel | G06F 16/24565 |
| 2017/0093755 | A1 * | 3/2017 | Pol | G06F 9/505 |
| 2017/0097970 | A1 * | 4/2017 | Bendel | G06F 16/254 |

FOREIGN PATENT DOCUMENTS

JP      2012008784 A   *   1/2012

* cited by examiner

*Primary Examiner* — Mahesh H Dwivedi
(74) *Attorney, Agent, or Firm* — Shook, Hardy & Bacon LLP/UPS

(57) ABSTRACT

Systems and methods are provided for processing requests to perform a stored procedure. A document chart is created having a unique identifier that corresponds to the stored procedure name. The document chart, being specific to the stored procedure, is populated with records that are associated with potential calls of the stored procedure. Each record comprises a key parameter and an output value, wherein the key parameter corresponds to a key that is generated based on the input parameters associated with the stored procedure call. The output value is communicated to the requesting client device without having to call the stored procedure on the targeted server.

20 Claims, 4 Drawing Sheets

ASYCHRONOUS DOCUMENT CHARTS

CROSS-REFERENCE TO RELATED APPLICATIONS

This application is a Divisional of U.S. application Ser. No. 17/718,048, filed Apr. 11, 2022, and entitled "ASYNCHRONOUS DOCUMENT CHARTS." The aforementioned application is expressly incorporated herein by reference in its entirety.

TECHNICAL FIELD

The present disclosure generally relates to improved processes for calling stored operations by a computing transaction. In particular aspects, this disclosure relates to using an architecture to extract, transform, and fetch information for client devices executing realtime transactions comprising stored procedures.

BACKGROUND

In the modern networked world, computing devices are perpetually carrying out computer executable transactions. Whether performing relatively simple transactions or complex ones, they often involve interacting with servers or databases to obtain information. Many computing transactions involve the use of a stored procedure. A stored procedure is a series of statements that are compiled and stored together that, when called by a computing transaction, perform an operation using a set of input parameters. Conventionally, stored procedures run on servers or databases such as SQL servers and involve fetching data from relational data repositories such as fact tables. When a computing device executes a computing transaction that involves a stored procedure, completion of the transaction is delayed until the stored procedure has completed running on the server, often causing user-perceptible delays and server congestion.

SUMMARY

Brief Description of the Drawings

Figure 1:
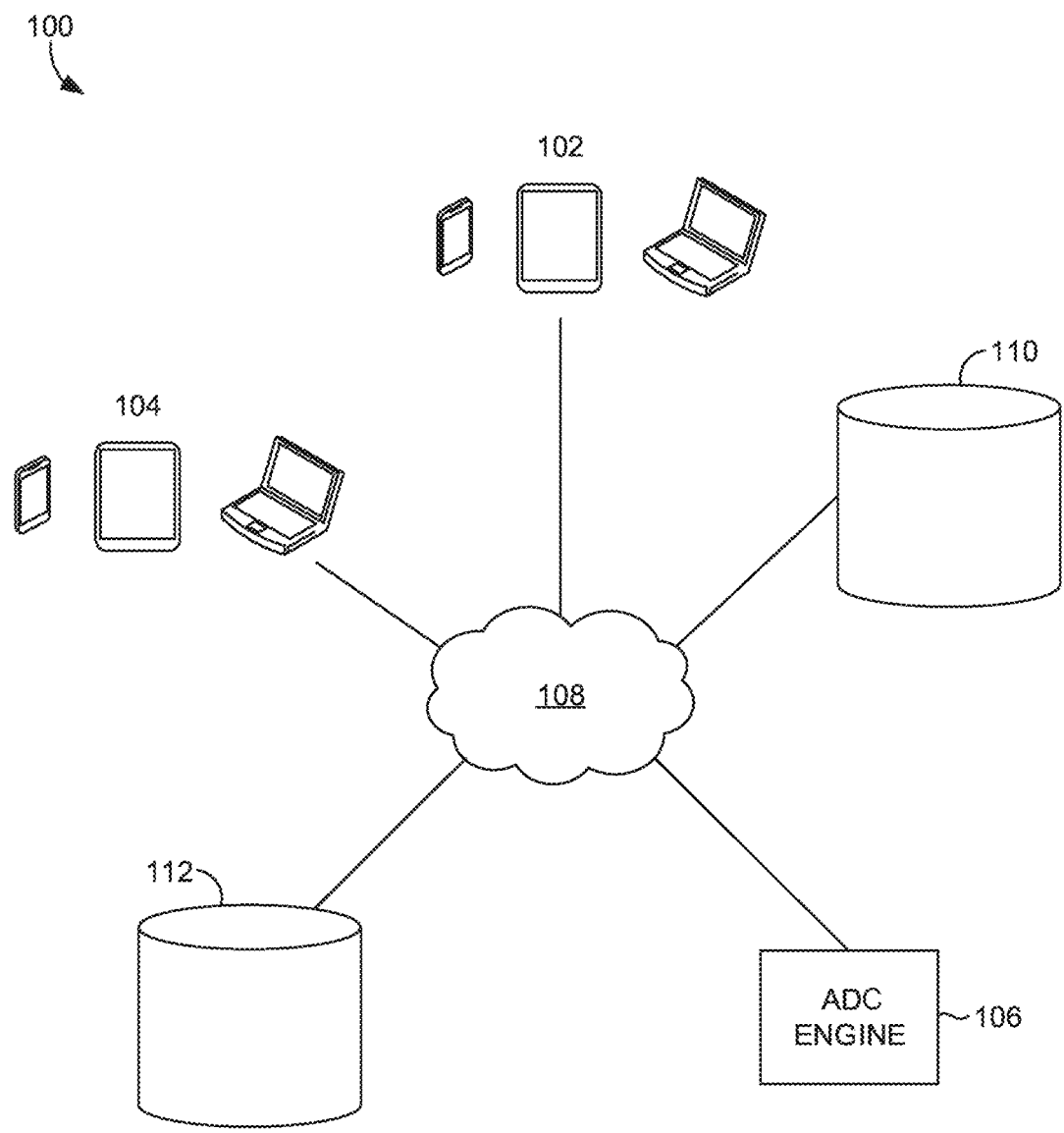

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
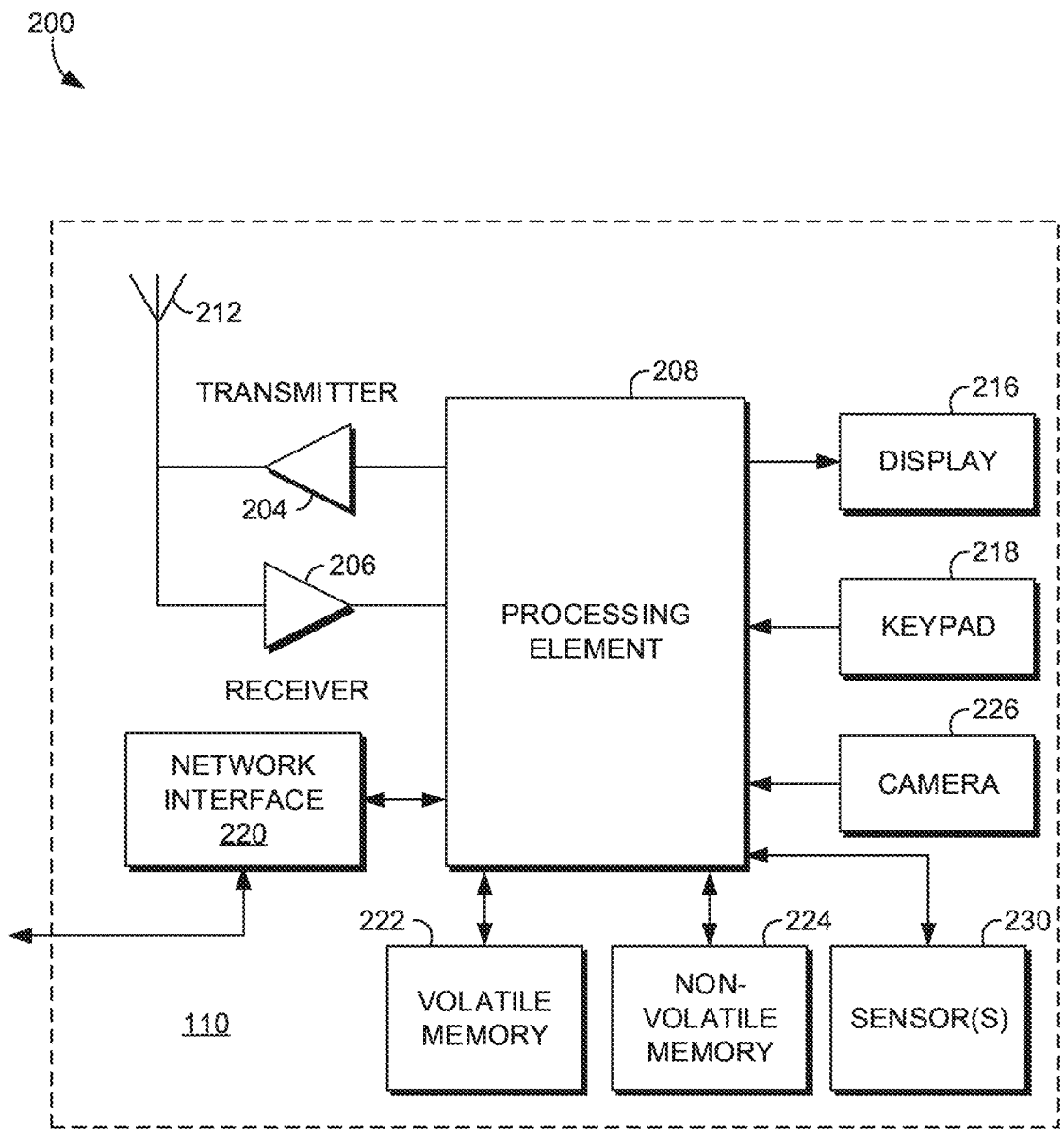

FIG. 2 is a schematic diagram of a computing entity in which aspects of the present disclosure are employed in, according to some embodiments.

Figure 3:
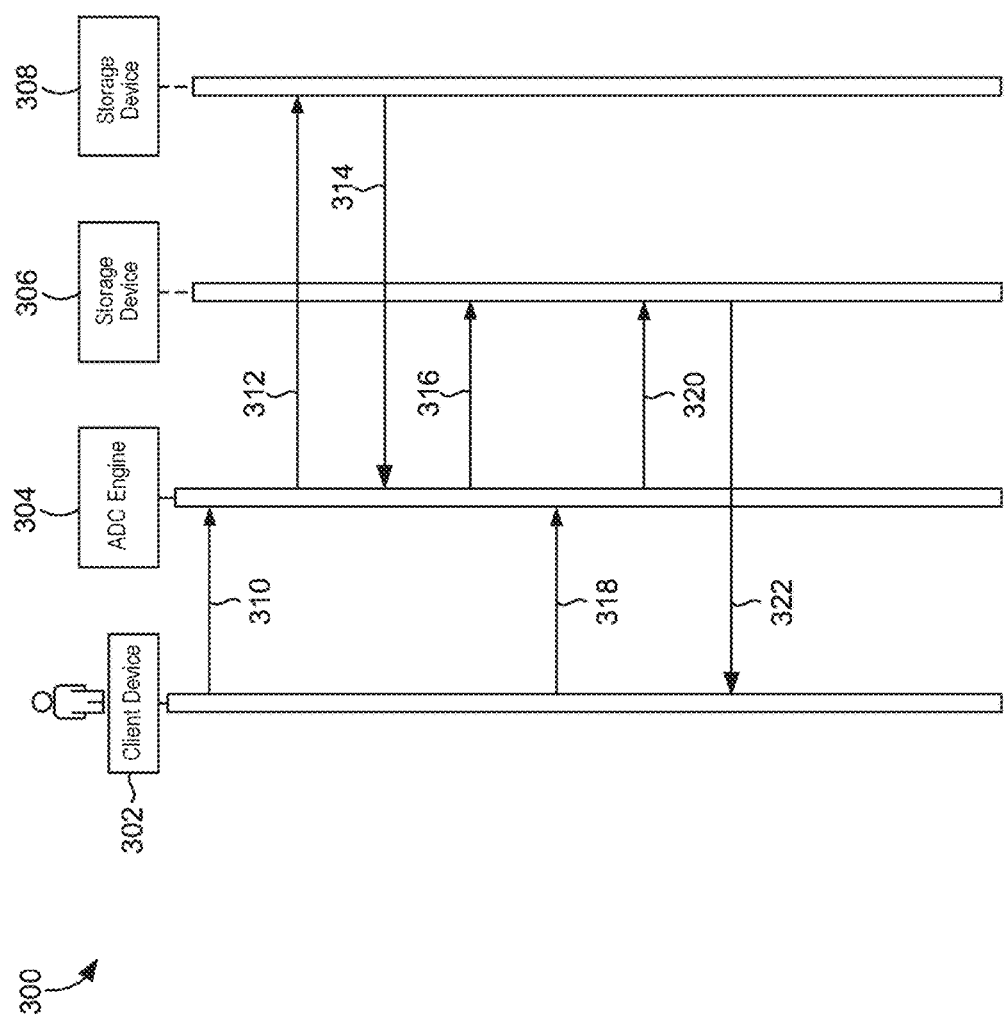

FIG. 3 shows a sequence diagram illustrating operations and processes that can be used for an improved process for calling stored operations by a computing transaction in accordance with various embodiments of the present invention.

Figure 4:
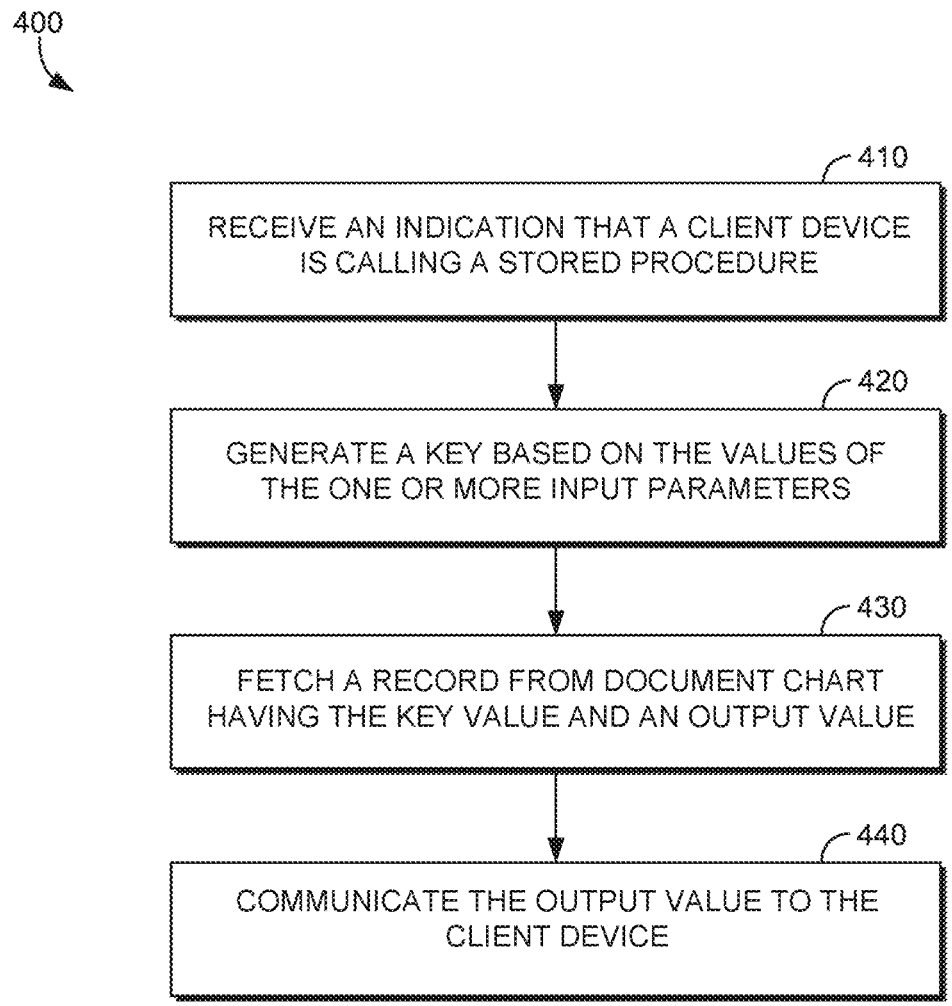

FIG. 4 illustrates a flow chart for a method for calling stored operations by a computing transaction in accordance with various embodiments of the present invention.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

Networked computing devices frequently interact with servers and databases to fetch information that is relevant to a user. Oftentimes, the interactions include the use of stored procedures. A stored procedure is a programmable group of one or more statements or references that contain executable statements to perform operations on a server or database. The stored procedure accepts input parameters and can return one or more output values to the calling program/transaction. One of the benefits of using stored procedures is the minimization of network resources to communicate instructions from the computing device to the server; instead of communicating several instructions to a server, a requesting computing device need only communicate the stored procedure instruction. However, when the user executes a computing transaction in realtime, stored procedures are immediately queued to be performed (i.e., called) at the server, and databases may experience congestion during peak times, degrading server performance and creating a user-perceptible delay for completion of the computing transaction.

Various embodiments of the present disclosure relate to the creation and utilization of an improved paradigm for executing stored procedures without the need to call the series of operations on a server. When a client device executing a real-time transaction requests a server to call a stored procedure as part of the transaction, one or more computer processing components described herein identifies a document chart that is unique to the stored procedure. A unique key is generated based on the one or more input parameters of the stored procedure and used to query the document chart. Using the parameter-based key, a record is fetched and an associated output value is returned. By avoiding calling the stored procedure on the server, the server resources are not engaged, improving server performance by eliminating the processing resources that would otherwise have been necessary to call the stored procedure; by fetching output values from the pre-cached document charts, overall processing time is also reduced with a user-perceptible improvement in transaction completion time. In real world testing, utilizing the paradigm of the present disclosure in lieu of calling stored procedures on a server was shown to reduce server resources to handle stored operation calls, manifesting in a reduction of the time to perform one or more stored operations by a factor of 6 when called by a real-time transaction.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and sequence diagram illustrations. Thus, it should be understood that each block of the block diagrams and sequence diagram illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and sequence diagram illustrations. Accordingly, the block diagrams and sequence diagram illustrations support various combinations of embodiments for performing the specified instructions, operations, or steps.

III. Exemplary System Architecture

FIG. 1 is a schematic diagram of an example computing environment 100 in which aspects of the present disclosure are employed in, according to some embodiments. As shown in FIG. 1, this particular computing environment 100 includes one or more client devices (i.e., computing entities), such as a first client device 102 and a second client device 104, an asynchronous document chart (ADC) engine 106, a first networked storage device 110, and a second networked storage device 112. Each of these components, entities, devices, systems, and similar words used herein interchangeably may be in direct or indirect communication with, for example, one another over the same or different wired and/or wireless networks, collectively represented by a network 108. Additionally, while FIG. 1 illustrates the various system entities as separate, standalone entities, the various embodiments are not limited to this particular architecture. For example, the ADC engine 106 may be a stand-alone computer processing component or it may be a computer processing component (e.g., a service) running at or near one of the networked storage devices. The computing environment 100 may have more or fewer computer processing components to accomplish the same objectives as the configuration set forth in FIG. 1; for example, there may be fewer or more client devices than shown, or the first networked storage device 110 and the second networked storage device may be a single entity.

Each of the first client device 102 and the second client device 104 are generally configured to be user-friendly devices that may be used to perform one or more data retrieval operations. The ADC engine 106 is generally configured to extract, transform, and load information using an ADC paradigm that will be discussed in greater detail herein. At a high level, the ADC engine 106 may create ADC data by extracting information from the first networked storage device 110 and transforming it in to a plurality of uniquely-keyed documents representing unique identifiers (generally referred to herein as document charts). The ADC engine 106 may cause the document charts and other ADC-related information to be stored on the second networked storage device 112. The ADC will also fetch data from the document charts when transactions running on client devices execute stored procedures relevant to the document charts and return the fetched data to the client devices without having to query the first networked storage device 110. In one aspect, the ADC engine 106 may comprise a software stack, hardware components configured to perform particular operations, or combinations thereof, for performing operations described in greater detail herein. Though represented as a single entity, the ADC engine 106 may be divided into a plurality of functional-based components; for example, extraction, transformation, and fetching may be handled by separate components. The ADC engine 106 may take the form of a software stack running on a client device such as the first or second client device 102, 104 or on a networked storage device such as the first or second networked storage devices 110, 112; however, in other aspects, the ADC engine 106 may comprise one or more stand-alone computing components that is separate from other entities, and only connected thereto via the network 108. Though they may be referred to generically or colloquially herein as a database, each of the first and second networked storage devices 110, 112 may take any desirable form for storing data (e.g., a server, couchbase, cloud/distributed storage, memory, and the like).

FIG. 2 provides a schematic of a computing entity 200 suitable for particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. For example, any one or more components of the computing entity 200 may comprise any one or more components of computing environment 100. For example, at least a portion of computing entity 200 may be a client device, such as the first client device 102 or the second client device 104 in FIG. 1. At least a portion of computing entity 200 may be a server, such as aspects where the ADC engine 106 is integrated into a networked storage device such as the first networked storage device 110 or the second networked storage device 112 of FIG. 1.

As indicated in FIG. 2, in particular embodiments, the computing entity 200 may include one or more communication interfaces 220 for communicating with various computing entities, such as by communicating data, content, information/data, and/or similar terms used herein interchangeably that can be transmitted, received, operated on, processed, displayed, stored, and/or the like. The computing entity 200 may include an air interface that comprises one or more of an antenna 212, a transmitter 204 (e.g., radio), a receiver 206 (e.g., radio), and a processing element 208 (e.g., CPLDs, microprocessors, multi-core processors, coprocessing entities, ASIPs, microcontrollers, and/or controllers) that provides signals to and receives signals from the transmitter 204 and receiver 206, respectively. The air interface may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. In some embodiments, the first networked storage device 110 includes one or more sensors 330. Using one or more of the communication interface 220 or the air interface, the computing entity 200 may be configured to interface with one or more other devices, components, or the network 109, of computer environment 100 of FIG. 1.

The computing entity 200 may also comprise a user interface (that can include a display 216 coupled to a processing element 208) and/or a user input interface (coupled to a processing element 208). For example, the user interface may be a user application, browser, user interface, and/or similar words used herein interchangeably executing on and/or accessible via the computing entity 200 to interact with and/or cause display of information from the logistics server(s) 105, as described herein. The user input interface can comprise any of a number of devices or interfaces allowing the computing entity 200 to receive information/data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the first networked storage device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. The computing entity 200 may also include a camera, imaging device, and/or similar words used herein interchangeably (e.g., still-image camera, video camera) configured to capture images. The computing entity 200 may be configured to capture images via the onboard camera 226, and to store those imaging devices/cameras locally, such as in the volatile memory 222 and/or non-volatile memory 224. As discussed herein, the computing entity 200 may be further configured to match the captured image data with relevant network data. For example, the camera 226 may be used to capture an image of a visually-perceptible indicia, such as a QR code, 2D barcode, or the like, wherein the visually-perceptible indicia is a unique identifier that is associated with a particular object (e.g., a hub, center, link, conveyance, shift, or the like)

which provide the basis for creating, modifying, or removing an proposed event, as discussed in greater detail herein.

The computing entity 200 can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 200. As indicated, this may include a user application that is resident on the entity or accessible through a browser or other user interface for communicating with other computing entities, such as any one or more of the computing entities shown in FIG. 1.

IV. Exemplary System Operation

As discussed above, modern information processing regularly involves client devices or backend computer processing components executing programs or applications that include one or more computing transactions. As used herein, the term computing transaction generally refers to a series of computer executable actions that are performed when a program runs. Relevant to the present disclosure, a computing transaction may include calling one or more stored procedures. The term "stored procedure" is used in its conventional sense and refers to a set of pre-configured computer executable statements that are generally configured to fetch information from a storage device. In some cases, stored procedures may be stored on the storage device, itself. A stored procedure has a name so it can be saved and accessed on the database. Generally, a stored procedure consistent with the present disclosure will be named and comprise one or more input values that a computer processing component provides to the stored procedure when it is called, logic/code that defines what the stored procedure does, and an output. When a computer processing component performs real-time transactions that include stored procedures, traditional processing using computer storage components can cause undesirable delays or expend computational resources at the computer processing component that may otherwise be avoided, increasing the speed and efficiency of the computer processing component as it executes the real-time transaction. In one exemplary use case, a customer of a logistics carrier may wish to obtain quotes for shipping a parcel; the customer may utilize a client device to access a website associated with the logistics carrier, provide a set of input parameters (e.g., origin location, destination location, weight) and request that the logistic carrier's website provide available options that relate to the set of input parameters. The customer's real-time transaction may call one or more stored procedures that may be necessary to, for example, provide an indication of what types of services are available (e.g., two day air, ground, etc.) and what each service would cost (for the set of input parameters).

The ADC paradigm is generally configured to convert a stored procedure call to an identifier, use the identifier to fetch a record of a document chart, and return an output to the computer processing component that originated the stored procedure call. As mentioned, when a stored procedure is called by a real-time transaction, the stored procedure call includes a set of input values comprising one or more parameters. Conventionally, a stored procedure would cause a server process that would query a fact table, relational data repository, or some other arrangement of stored/indexed information. Instead of querying the information contained in the conventional manner, the present disclosure creates a unique document chart associated with the each stored procedure. In other words, a first stored procedure call would be associated with a first document chart and a second stored procedure call would be associated with a second document chart. Each document chart is associated with a unique identifier. When a stored procedure is called by a real-time transaction, the appropriate document chart is identified and utilized by the ADC paradigm. In one aspect, the unique identifier associated with the stored procedure name may be determined based on querying a document chart index comprising a plurality of records wherein each record comprises a stored procedure name and the corresponding unique identifier. In aspects, the unique identifier associated with the document chart is agnostic to any input values associated with the stored procedure (i.e., the same document chart is associated with the same stored procedure when the input comprises a first set of parameters and a second set of (different) parameters). In other aspects, the unique identifier associated with the document chart is at least partially based on input values with the called stored procedure. For example, if a stored procedure has four possible input parameters, then a first call of the stored procedure using values for only the first two parameters (whether because the third and fourth were not entered or used default values) will have a first unique identifier (and, therefore a first document chart) and a second call of the stored procedure using values for all four parameters will have a second unique identifier (and, therefore a second document chart), the first and second unique identifiers (and the first and second document charts) being different. In aspects where the unique identifier is agnostic to input values, the unique identifier is associated with the name of the stored procedure; in aspects where the unique identifier is at least partially based on input values, the unique identifier may comprise a concatenation of a first portion associated with the name of the stored procedure and a second portion representing the input parameters.

Once the unique identifier, and therefore the correct document chart, has been determined based on the stored procedure call, a key will be determined in order to fetch and return the appropriate output. In one aspect, the key may be based on all of the input values that are input by the computer processing component that is calling the stored procedure call; for example, if a stored procedure named "ship" were called with a first parameter (e.g., origin location) and a second parameter (e.g., destination location), but without a third parameter (e.g., parcel weight) and without a fourth parameter (e.g., service), the key would comprise a concatenated sequence comprising a first portion that represented the origin location value and a second portion representing the destination location value. In such an example, the key may be used to fetch an output value from the document chart by selecting a record from the document chart having the key value and the associated output value, and returning it to the requesting computer processing component, wherein the output may be in the form of a single value or a plurality of values. In another aspect, the key may be based on non-default input values that are input by the computer processing component that is calling the stored procedure; for example, if the stored procedure "ship" was called with the origin location, destination location, and a default value for size, the key creation may ignore the size parameter because it is determined that the input value was the default value, and concatenate the same key as in the previous example. Using the ADC paradigm, every valid and unique set of input values associated with a particular stored procedure will have a unique key, and every unique key will have a record in the stored-procedure-specific document chart. Using the key to fetch the correct record, the appropriate output value from the record can be returned to the requesting computer processing component without having had to call the stored procedure on the server (as would have otherwise been required to complete the computing transaction).

An ADC engine, such as the ADC engine 106 of FIG. 1 is configured to create one or more document charts for use with the present disclosure. At a high level, a document chart is created by determining a unique identifier associated with a stored procedure, extracting data associated with the stored procedure from a conventional server or database, and transforming the extracted data into one or more input-parameter-specific records, each record having a unique key and an output value. A document chart may be created at the time a stored procedure is created or at the first instance when a stored procedure is called. Once created, the document chart is asynchronous in that it is not persistently synchronized with the source data that was used to create the document chart; it may be updated at a pre-determined recurrence (e.g., weekdays at 0500 GMT), when network/server congestion is below a configurable threshold, or on demand. The document chart may be created and executed in any desirable programming language, framework, or technology, such as java, python, docnet core, ruby, python, and the stored procedure associated with the document chart may be in the form of any desirable server protocol, such as SQL, couchbase, or mongodb. The document chart is created by determining a unique identifier associated with the stored procedure and associating the unique identifier with the document chart. Using a unique identifier, each stored procedure will have its own document chart. The stored-procedure-unique document chart is then populated with one or more records associated with the stored procedure.

The document chart may be populated based on values from a fact table or other relational data repositories stored on a first storage device, such as the first networked storage device 110 of FIG. 1. The records from the first storage device are extracted to create one or more unique input sequences, wherein each unique input sequence represents a unique combination of values for the one or more input parameters of the stored procedure. A record is created in the document chart for each unique input sequence having a key value based on the values of the one or more input parameters and an associated output value. The output value may be in the form of a value, array, operation, or any other desirable output that would otherwise have been manifested if the stored procedure was called on the first storage device. For example, if a stored procedure comprised selecting a record from a table based on a single input parameter (selected from 4 possibilities) and output a single output parameter, the document chart would be populated with four records, wherein each record comprised a unique key representing each unique input parameter value and the corresponding output parameter. In more complex implementations a stored procedure may require a join operation between two tables (i.e., not a simple table select). In such an implementation the document chart may be created by running a select operation on the two tables that are joined with the condition from the stored procedure, the results of the join operation will be looped in, and records will be populated for each unique key, wherein each record comprises an output value. Once the document chart is created, it may be stored on the same storage device as the data source that was used to create the document chart (e.g., the first networked storage device 110 of FIG. 1) or the document chart may be stored in a different location (e.g., the second networked storage device 112 of FIG. 1, in the form of a distributed server such as a couchbase server).

Turning now to FIG. 3, a sequence diagram is provided representing a process 300 for creating and utilizing the ADC paradigm. At a first step, 310, a computer processing component such as a client device 302, such as the first client device 102 or the second client device 104 of FIG. 1, initiates the creation of a document chart for association with a stored procedure by communicating a request to the ADC engine 304. The ADC engine 304, such as the ADC engine 106 of FIG. 1, in turn identifies a name associated with the stored procedure and one or more input parameters. At a second step 312, the ADC engine 304 queries a first networked storage device 308, which may take the form of a relational database storing a plurality of records, at least some of which have relevance to the stored procedure. In one aspect the plurality of records may take the form of a fact table or one or more data tables. At a third step 314, the first networked storage device communicates one or more records to the ADC that are relevant to the stored procedure. At a fourth step 316, the ADC engine 304 creates and communicates the document chart to a second networked storage device 306, such as the second networked storage device 112 of FIG. 1. The first networked storage device may be different than the first network storage device and the second networked storage device may take the form of a couchbase server.

At a fifth step 318, the client device 302, or any other computer processing component, communicates an indication to the ADC engine 304 that the client device 302 is requesting a stored procedure to be called on the first networked storage device. The request to call the stored procedure may comprise a stored procedure name and at least one input parameter. At a sixth step 320, the ADC engine 304 determines a unique identifier associated with the stored procedure name and generates a key based on the at least one input parameter. In one aspect the ADC engine 304 may determine the unique identifier is associated with the stored procedure name based on querying a document chart index. The key generation at the sixth step 320 may be performed in accordance with any one or more aspects described herein. Continuing at the sixth step 320, the ADC engine accesses the document chart associated with the unique identifier, wherein the document chart is stored on the second networked storage device 306, and fetches a record having a parameter that matches the key, wherein the record further comprises an output value. At a seventh step 322, the second networked storage device communicates the output value to the client device 302 without having called the stored procedure on the first networked storage device.

Turning now to FIG. 4, a flow diagram is illustrated for a method 400 for processing requests for performing stored procedures. At a first step 410, the method 400 comprises receiving, from a first client device, an indication that the client device is requesting a stored procedure to be called on a first storage device, the request comprising a stored procedure name and at least one input parameter, according to any one or more aspects described herein. At a second step 420, the method 400 comprises generating a key based at least in part on the at least one input parameter, according to any one or more aspects described herein. At a third step 430, the method 400 comprises fetching a record from a document chart associated with the stored procedure having a condition matching the key, the record further comprising an output value, according to any one or more aspects described herein. At a fourth step 440, the method 400 comprises communicating the output value to the first client device without calling the stored procedure on the first storage device, according to any one or more aspects described herein.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

What is claimed is:

1. A method comprising:
    querying, by a computing entity, a plurality of records from a first storage device, wherein each record of the plurality of records is relevant to calling a stored procedure and comprises a first value for a first input parameter to the stored procedure, a second value for a second input parameter to the stored procedure, and an output value returned by the stored procedure;
    creating, by the computing entity, a unique identifier for the stored procedure;
    generating, by the computing entity, a document chart associated with the unique identifier; and
    for each record of the plurality of records:
        generating, by the computing entity, a key based at least in part on the first value and the second value; and
        populating, by the computing entity, the document chart with an output record comprising the key and the output value.

2. The method of claim 1, further comprises:
    receiving, by the computing entity, an indication that a client device submitted a request to have the stored procedure called, the request comprising a stored procedure name and a first input value for the first input parameter and a second input value for the second input parameter;
    determining, by the computing entity and based at least in part on the stored procedure name, the unique identifier associated with the document chart;
    generating, by the computing entity and based at least in part on the first input value and the second input value, the key;
    fetching, by the computing entity, the output record from the document chart having a condition matching the key; and
    communicating, by the computing entity, the output value from the output record to the client device without calling the stored procedure on the first storage device.

3. The method of claim 2, wherein the client device is requesting the stored procedure to be called in real-time as part of the client device executing a computing transaction.

4. The method of claim 1, wherein generating the key based at least in part on the first value and the second value comprises concatenating a first indicator associated with the first value and a second indicator associated with the second value.

5. The method of claim 1, further comprising storing the document chart on a second storage device.

6. The method of claim 1, wherein querying the plurality of records from the first storage device comprises running a select operation on a first table associated with the first input parameter and a second table associate with the second input parameter that are joined with a condition from the stored procedure.

7. The method of claim 6, wherein each of the first table and the second table is stored on a second storage device that is different than the first storage device.

8. A system comprising:
    a computer-readable medium storing instructions; and
    a processing device communicatively coupled to the computer-readable medium, wherein the processing device is configured to execute the instructions and thereby perform operations comprising:
        querying a record from a first storage device, wherein the record is relevant to calling a stored procedure and comprises a value for at least one input parameter to the stored procedure and an output value returned by the stored procedure;
        creating a unique identifier for the stored procedure;
        generating a document chart associated with the unique identifier;
        generating a key based at least in part on the value; and populating the document chart with an output record comprising the key and the output value.

9. The system of claim 8, wherein the operations further comprise:
receiving an indication that a client device submitted a request to have the stored procedure called, the request comprising a stored procedure name and an input value for the at least one input parameter;
determining, based at least in part on the stored procedure name, the unique identifier associated with the document chart;
generating, based at least in part on the input value, the key;
fetching the output record from the document chart having a condition matching the key; and
communicating the output value from the output record to the client device without calling the stored procedure on the first storage device.

10. The system of claim 9, wherein the client device is requesting the stored procedure to be called in real-time as part of the client device executing a computing transaction.

11. The system of claim 8, wherein the operations further comprise storing the document chart on a second storage device.

12. The system of claim 8, wherein the at least one input parameter comprises a first input parameter and a second input parameter and querying the record from the first storage device comprises running a select operation on a first table associated with the first input parameter and a second table associate with the second input parameter that are joined with a condition from the stored procedure.

13. The system of claim 12, wherein each of the first table and the second table is stored on a second storage device that is different than the first storage device.

14. A non-transitory computer-readable medium storing computer-executable instructions that, when executed by computing hardware, configure the computing hardware to perform operations comprising:
querying a plurality of records from a first storage device, wherein each record of the plurality of records is relevant to calling a stored procedure and comprises at least one of a first value for a first input parameter to the stored procedure or a second value for a second input parameter to the stored procedure, and an output value returned by the stored procedure;
creating, based at least in part on a stored procedure name and the first input parameter, a first unique identifier for the stored procedure;
creating, based at least in part on the stored procedure name, the first input parameter, and the second input parameter, a second unique identifier for the stored procedure;
generating a first document chart associated with the first unique identifier;
generating a second document chart associated with the second unique identifier; and
for each record of the plurality of records:
determining whether the second value is null or a default value;
responsive to determining the second value is null or the default value:
generating a key based at least in part on the first value; and
populating the first document chart with an output record comprising the key and the output value; and
responsive to determining the second value is not null or the default value:
generating the key based at least in part on the first value and the second value; and
populating the second document chart with the output record comprising the key and the output value.

15. The non-transitory computer-readable medium of claim 14, wherein the operations further comprise:
receiving an indication that a client device submitted a request to have the stored procedure called, the request comprising the stored procedure name and a first input value for the first input parameter and a second input value for the second input parameter;
determining the second input value is not null or the default value;
responsive to determining the second input value is not null or the default value, determining, based at least in part on the stored procedure name, the first input parameter, and the second input parameter, the second unique identifier associated with the second document chart;
generating, based at least in part on the first input value and the second input value, the key;
fetching the output record from the second document chart having a condition matching the key; and
communicating the output value from the output record to the client device without calling the stored procedure on the first storage device.

16. The non-transitory computer-readable medium of claim 15, wherein the operations further comprise:
receiving a second indication that a second client device submitted a second request to have the stored procedure called, the second request comprising the stored procedure name and a third input value for the first input parameter and a fourth input value for the second input parameter;
determining the fourth input value is at least one of null or the default value;
responsive to determining the fourth input value is at least one of null or the default value, determining, based at least in part on the stored procedure name and the first input parameter, the first unique identifier associated with the first document chart;
generating, based at least in part on the first input value, the key;
fetching the output record from the first document chart having a condition matching the key; and
communicating the output value from the output record to the second client device without calling the stored procedure on the first storage device.

17. The non-transitory computer-readable medium of claim 14, wherein generating the key based at least in part on the first value and the second value comprises concatenating a first indicator associated with the first value and a second indicator associated with the second value.

18. The non-transitory computer-readable medium of claim 14, further comprising storing the first document chart and the second document chart on a second storage device.

19. The non-transitory computer-readable medium of claim 14, wherein querying the plurality of records from the first storage device comprises running a select operation on a first table associated with the first input parameter and a second table associate with the second input parameter that are joined with a condition from the stored procedure.

20. The non-transitory computer-readable medium of claim 19, wherein each of the first table and the second table is stored on a second storage device that is different than the first storage device.

* * * * *